(12) United States Patent
Nohara et al.

(10) Patent No.: US 9,599,225 B2
(45) Date of Patent: Mar. 21, 2017

(54) BLOCKING CONFIGURATION OF OIL PRESSURE CIRCUIT HOLE

(71) Applicant: Komatsu Ltd., Tokyo (JP)

(72) Inventors: Takuya Nohara, Tochigi (JP); Hiroyuki Chikugo, Oyama (JP); Shuuji Hori, Oyama (JP); Mitsumasa Akashi, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/383,120

(22) PCT Filed: Jan. 7, 2014

(86) PCT No.: PCT/JP2014/050077
§ 371 (c)(1),
(2) Date: Sep. 5, 2014

(87) PCT Pub. No.: WO2015/104792
PCT Pub. Date: Jul. 16, 2015

(65) Prior Publication Data
US 2016/0245408 A1    Aug. 25, 2016

(51) Int. Cl.
*F16J 13/12*    (2006.01)
*F16L 55/11*    (2006.01)

(52) U.S. Cl.
CPC ........... *F16J 13/12* (2013.01); *F16L 55/1108* (2013.01)

(58) Field of Classification Search
CPC ....... F01M 11/04; F01M 11/0408; F16J 13/12
USPC ........................................................ 184/1.5
See application file for complete search history.

(56) References Cited

U.S. PATENT DOCUMENTS 3,214,181 A * 10/1965 Rood ..................... F16J 13/12
220/378
3,284,047 A    11/1966 Frank Herta
4,620,641 A    11/1986 Beer
2010/0163131 A1    7/2010 Fehr et al.
(Continued)

FOREIGN PATENT DOCUMENTS

CN    103267199 A    8/2013
DE    1751535 U    8/1957
(Continued)

OTHER PUBLICATIONS

International Search Report and Written Opinion dated Apr. 15, 2014, issued for PCT/JP2014/050077.

*Primary Examiner* — Michael Mansen
*Assistant Examiner* — Mark K Buse
(74) *Attorney, Agent, or Firm* — Locke Lord LLP

(57) ABSTRACT

A blocking configuration of an oil pressure circuit hole includes a plug screwed together with an aperture end portion of the oil pressure circuit hole provided to a main body. The plug includes: a shaft portion; an external thread portion disposed on a leading end of the shaft portion; an O-ring mounted on an outer periphery of a base end portion of the shaft portion and pressed between the outer periphery of the shaft portion and an inner periphery of the oil pressure circuit hole to seal them; a flange portion having an external diameter larger than that of the shaft portion and disposed on a part of a base end side of a storage groove on which the O-ring is mounted; and a polygonal column-shaped head portion on which a tightening tool is mounted and disposed on a part of a base end side of the flange portion.

3 Claims, 3 Drawing Sheets

(56) References Cited

U.S. PATENT DOCUMENTS

2010/0245310 A1 9/2010 Hashimoto
2015/0240677 A1* 8/2015 Candela ............. F01M 11/0408
                184/1.5

FOREIGN PATENT DOCUMENTS

| | | |
|---|---|---|
| DE | 202008011341 U1 | 10/2008 |
| GB | 418072 A | 10/1934 |
| JP | 44-13726 Y1 | 6/1969 |
| JP | 3-312 U | 1/1991 |
| JP | 05-288281 A | 11/1993 |
| JP | 2007-078094 A | 3/2007 |
| JP | 3133033 U | 6/2007 |
| JP | 2013-029126 A | 2/2013 |
| JP | 5288281 B2 | 9/2013 |

* cited by examiner

BLOCKING CONFIGURATION OF OIL PRESSURE CIRCUIT HOLE

FIELD

The present invention relates to a configuration for blocking an aperture end portion of an oil pressure circuit hole provided to a main body.

BACKGROUND

In cases where an oil pressure path or a spool hole is provided inside a main body of an oil pressure apparatus, a certain method has been well-used. in this method, an oil pressure circuit hole is provided so as to be opened with respect to an outer surface of the main body, and then, an aperture end portion of this oil pressure circuit hole is blocked with a plug. The plug herein includes a shaft portion and a head portion. An external thread portion is disposed on a leading end of the shaft portion, while the head portion is disposed on a base end portion of the shaft portion. The head portion herein is a portion on which a tightening tool such as a wrench is mounted. The head portion is further shaped like a polygonal column which has an external diameter larger than that of the shaft portion. A storage groove is provided to the base end portion of the shaft portion in order to mount an O-ring. The storage groove herein is a ring-shaped recess. An external diameter of the storage groove is configured to be smaller than that of the shaft portion.

In a case of applying this plug and blocking the aperture end portion of the oil pressure circuit hole, the plug is screwed together with the aperture end portion of the oil pressure circuit hole with the O-ring mounted on the storage groove. In cases where the plug is screwed together with the oil pressure circuit hole with a preset standard torque, the O-ring compressed between the plug and an inner periphery of the oil pressure circuit hole is pressed by an outer periphery of the storage groove and the inner periphery of the oil pressure circuit hole. As a result, the oil pressure circuit hole and the plug are sealed (see, for example, Patent Literatures 1 and 2).

In order to prevent oil leakage from between the oil pressure circuit hole and the plug, it is necessary to maintain a state in which the plug is screwed together with the oil pressure circuit hole without a backlash. In other words, when axial force continuously acts on the plug, it is possible to maintain the state in which the O-ring is pressed by the outer periphery of the storage groove and the inner periphery of the oil pressure circuit hole, and to prevent the oil leakage from between the oil pressure circuit hole and the plug. The axial force acting on the plug is reaction force of elastic deformation in a longitudinal direction. The reaction force applied to the plug is caused when the plug is screwed together with the oil pressure circuit hole. In a case of the above-mentioned plug, the external diameter of the storage groove is configured to be smaller than that of the other shaft portion. Therefore, the axial force acts on the plug because a part where the storage groove is disposed elastically deforms in the longitudinal direction when the plug is screwed together with the oil pressure circuit hole.

However, in the shaft portion, regarding an amount of the elastic deformation of the part where the storage groove is disposed, it can be expected to have only a small amount. Accordingly, even. in a case where little plastic deformation or looseness appears on the head portion of the plug which is to be a bearing surface, for example, due to an influence of aging, the axial force disperses and the plug gets loose. As a result, there is a possibility that oil may leak from a gap between the plug and the inner periphery of the oil pressure circuit hole. Specifically, the above-mentioned problem is further obvious in a case of a plug disposed inside a main body of an oil pressure apparatus to block an oil pressure path or a spool hole. It is because extremely high oil pressure of about 480 standard atmospheres repetitively acts on the plug.

On the other hand, Patent Literature 3 discloses a plug for blocking an oil filler of an operating oil tank. The plug herein is provided for blocking the oil filler while involving a washer between the plug and an aperture end portion of the oil filler.

CITATION LIST

Patent Literatures

Patent Literature 1: Japanese Patent Application Laid-open No. 5-288281
Patent Literature 2: Japanese Patent Application Laid-open No. 2013-29126
Patent Literature 3: Japanese Patent Application Laid-open No. 2007-78094

SUMMARY

Technical Problem

A plug configuration including a plug, a washer, a seal, and a latching unit disclosed in Patent Literature 3 is applied to a portion which extremely low oil pressure acts thereon. The plug herein is not supposed to be a plug disposed inside a main body of an oil pressure apparatus to block an oil pressure path or a spool hole, and which high oil pressure acts thereon. Suppose a case where a tightening torque is highly set so as to be applied to a high-pressured portion. A flange extends and deforms, which results in providing a gap between the flange and the washer, thereby causing oil leakage.

Considering the above-mentioned situation, an object of the present invention is to provide a blocking configuration of an oil pressure circuit hole capable of preventing the oil leakage from the oil pressure circuit hole for a prolonged period.

Solution to Problem

To achieve the above-described object, in a blocking configuration of an oil pressure circuit hole according to the present invention, in which a plug is screwed together with an aperture end portion of the oil pressure circuit hole provided to a main body, the plug including an external thread portion disposed on a leading end of a shaft portion, and including an O-ring mounted on an outer periphery of a base end portion of the shaft portion, and in which the O-ring is pressed between the outer periphery of the shaft portion and an inner periphery of the oil pressure circuit hole to seal the oil pressure circuit hole and the plug, the plug includes: a flange portion having an external diameter larger than that of the shaft portion, the flange portion being disposed on a part of a base end side of a storage groove on which the O-ring is mounted; and a polygonal column-shaped head portion on which a tightening tool is mounted, the head portion being disposed on a part of a base end side of the flange portion, the flange portion has a plate thickness diameter, in a longitudinal direction of the shaft portion, smaller than a height diameter of the head portion, and the head portion has an external diameter equal to or lower than an aperture of the oil pressure circuit hole, and the flange portion is pressed on an outer surface of the main body as a bearing surface when the plug is screwed together with the aperture end portion of the oil pressure circuit hole.

Moreover, in the above-described blocking configuration of the oil pressure circuit hole according to the present invention, the aperture end portion of the oil pressure circuit hole includes a taper portion whose inner diameter gradually grows larger in a direction of an aperture end, and the O-ring is pressed on an inner periphery of the taper portion.

Moreover, in the above-described blocking configuration of the oil pressure circuit hole according to the present invention, the head portion of the plug has the external diameter equal to or lower than an external diameter of the shaft portion.

Advantageous Effect of Invention

In the present invention, in cases where a plug is screwed together with an aperture end portion of an oil pressure circuit hole disposed on a main body, axial force acts on the plug while a flange portion, as well as a part where a storage groove is provided, elastically bends and deforms. Therefore, an amount of elastic deformation of the plug in a longitudinal direction increases. Even in a case were plastic deformation or looseness appears on a bearing surface of the plug, for example, due to an influence of aging, a state of the elastic deformation remains, and there is no possibility that the axial force disperses. As a result, it is less likely that the plug gets loose for a prolonged period, and it is possible to prevent oil leakage from the oil pressure circuit hole.

DESCRIPTION OF EMBODIMENT

Hereinafter, a preferable embodiment of a blocking configuration of an oil pressure circuit hole according to the present invention will be described in detail with reference to the accompanying drawings.

Figure 1:
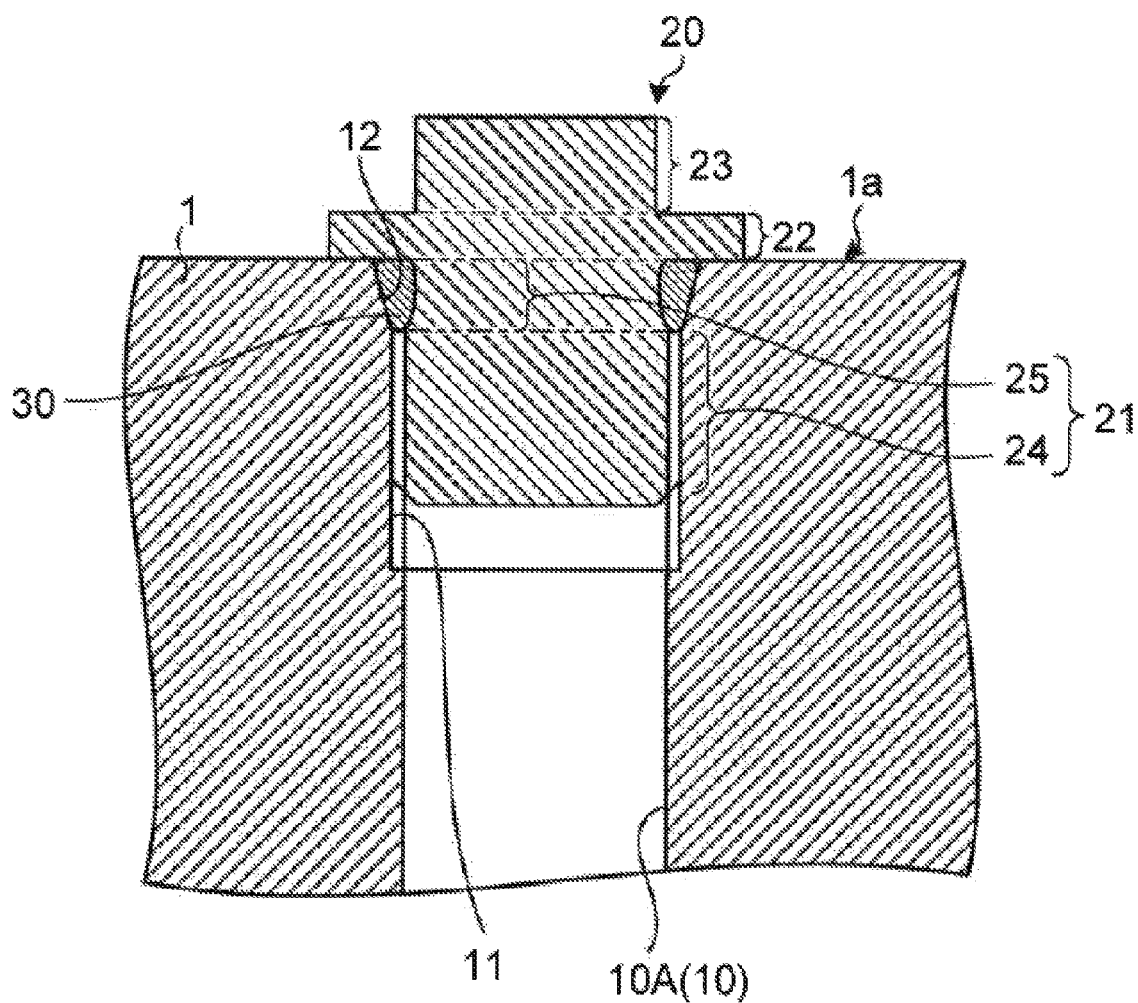
FIG. 1 is a cross-sectional view illustrating a main section of an oil pressure apparatus to which a blocking configuration of an oil pressure circuit hole according to an embodiment of the present invention is applied.

FIG. 1 is a view illustrating a main section of an oil pressure apparatus to which a blocking configuration of an oil pressure circuit hole according to an embodiment of the present invention is applied. In the oil pressure apparatus exemplified herein, an oil pressure circuit hole 10 is provided so as to be opened with respect to an outer surface 1a of a main body 1. Herein, by blocking an aperture end portion of the oil pressure circuit hole 10 with a plug 20, an oil pressure path 10A is provided inside the main body 1.

Figure 2:
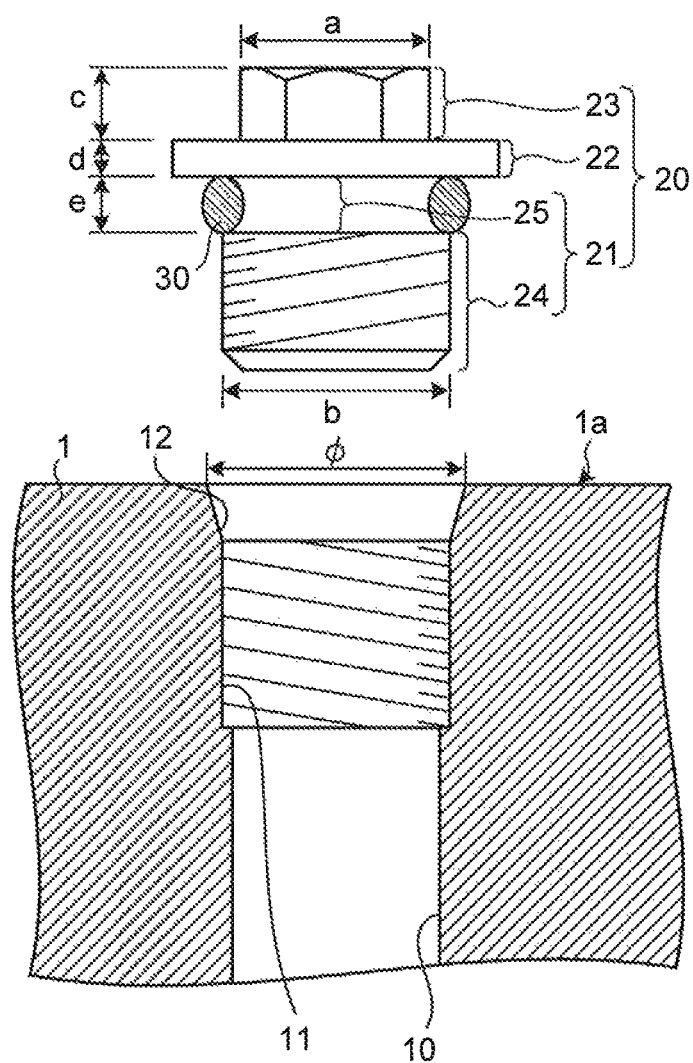
FIG. 2 is a cross-sectional view illustrating a state before screwing a plug together with a main body of the oil pressure apparatus illustrated in FIG. 1.

As illustrated in FIGS. 1 and 2, the oil pressure circuit hole 10 of the main body 1 includes an internal thread portion 11 and a taper portion 12. The internal thread portion 11 herein is disposed by providing a thread groove in an inner periphery of the oil pressure circuit hole 10. The taper portion 12 is disposed in a part, of the oil pressure circuit hole 10, closer to an aperture side than the internal thread portion 11. An inner diameter of the taper portion 12 gradually grows larger in a direction of the aperture end.

On the other hand, in the plug 20 which closes the aperture end portion of the oil pressure circuit hole 10, a shaft portion 21, a flange portion 22, and a head portion 23 are integrally formed by a carbon steel for machine structural use such as an S43C, etc. The shaft portion 21 is a cylindrical portion including an external thread portion 24 on a leading end portion, as well as a storage groove 25 on a base end portion. The external thread portion 24 is a portion which screws together with the internal thread portion 11 of the oil pressure circuit hole 10 provided to the main body 1. The storage groove 25 is a ring-shaped recess. An external diameter thereof is smaller than a core diameter of the external thread portion 24. The flange portion 22 is a disc-shaped portion protruded from the base end of the storage groove 25 in a direction of outer periphery. This flange portion 22 has an external diameter larger than an aperture ϕ of the oil pressure circuit hole 10 which is opened with respect to the outer surface 1a of the main body 1. The head portion 23 is a portion on which a tightening tool such as a wrench is mounted. In the present embodiment, the head portion 23 is disposed, on a part which is to be a base end side of the flange portion 22, so as to be shaped like a regular hexagonal column. Herein, a diameter "a" of a circumcircle of the head portion 23 is smaller than an external diameter "b" of the shaft portion 21.

As illustrated in FIG. 2, a height dimension "c" in the longitudinal direction of the head portion 23 is provided large enough to carry out screwing operation while mounting a tightening tool. By contrast, the above-mentioned flange portion 22 is configured to have a plate thickness dimension "d" smaller than the height dimension "c" in the longitudinal direction of the head portion 23. Specifically, in the present embodiment, the plug 20 is configured to include the flange portion 22 having the plate thickness dimension "d" smaller than, for example, ¼ of the external diameter "b" of the shaft portion 21.

In a case of blocking the oil pressure circuit hole 10 of the main body 1 by using the plug 20 having the above-mentioned configuration, it is sufficient to mount an O-ring 30 on the storage groove 25, and to screw the plug 20 together with the aperture end portion of the oil pressure circuit hole 10 while pressing the flange portion 22 on the outer surface 1a of the main body 1 as a bearing surface. In cases where the plug 20 is screwed together with the oil pressure circuit hole 10 with a preset standard torque, in accordance with nominal diameters of the thread portions, the O-ring 30 compressed between the plug 20 and an inner periphery of the taper portion 12 disposed on the oil pressure circuit hole 10 is pressed by an outer periphery of the storage groove 25 and the inner periphery of the taper portion 12, as illustrated in FIG. 1. As a result, the oil pressure circuit hole 10 and the plug 20 are sealed.

Figure 3:
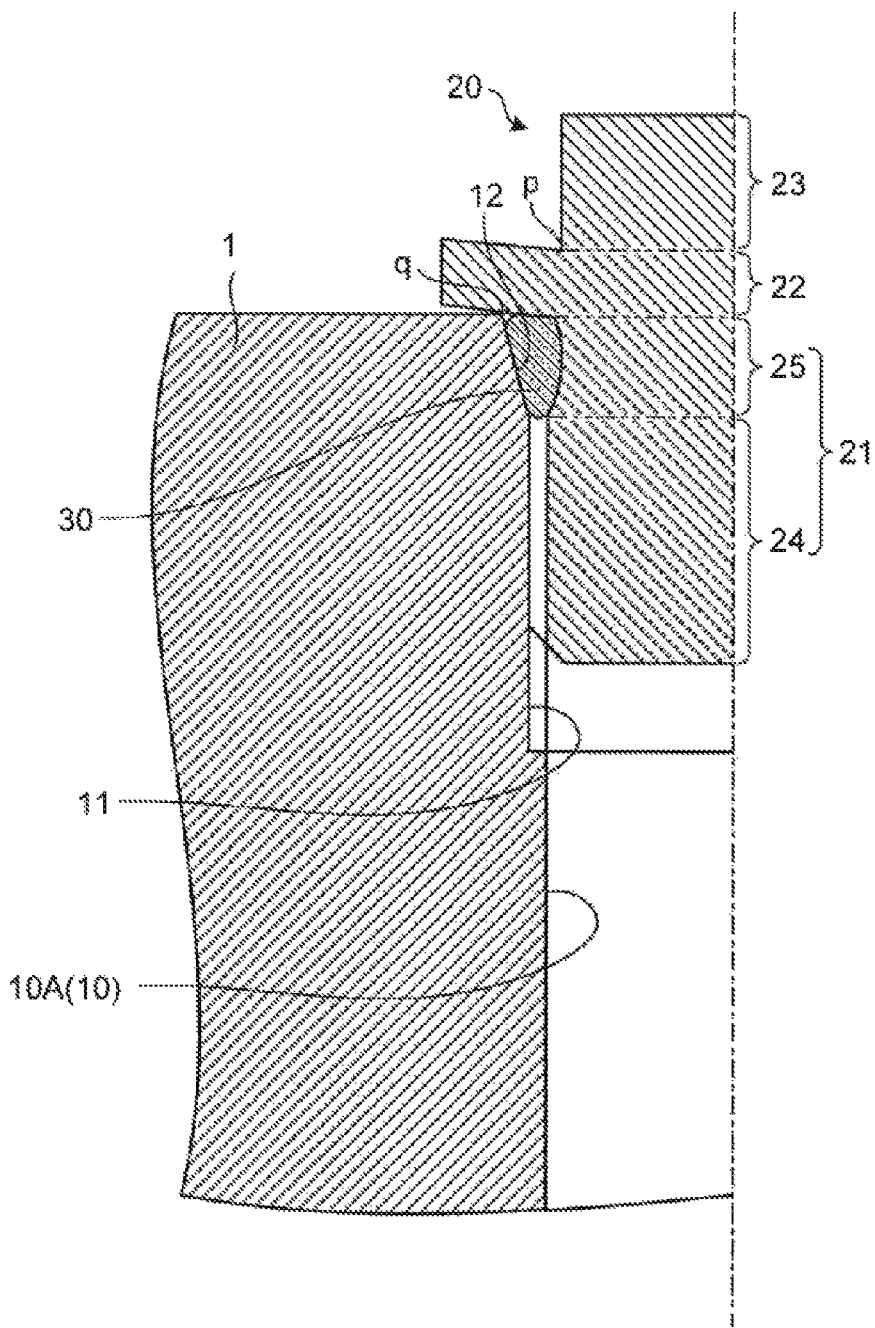
FIG. 3 is a cross-sectional view illustrating a schematic enlarged view of the main section of the oil pressure apparatus illustrated in FIG. 1.

Herein, in the plug 20 applied in the present embodiment, the circumcircle of the hexagonal column-shaped head portion 23 is configured to have the diameter "a" smaller than the external diameter "b" of the shaft portion 21. Therefore, in cases where the plug 20 is screwed together with the oil pressure circuit hole 10, while setting a boundary "p" as a fulcrum between the flange portion 22 and the head portion 23, force is applied from an aperture edge "q" of the oil pressure circuit hole 10 to the flange portion 22 pressed on the outer surface 1a of the main body 1 as the bearing surface. Such a case is schematically illustrated in FIG. 3. As mentioned above, the plug 20 is configured so as to include the flange portion 22 having the plate thickness dimension "d", in the longitudinal direction of the shaft portion 21, smaller than the height dimension "c" of the head portion 23. Accordingly, in the shaft portion 21 of the plug 20, the flange portion 22, as well as a part where the storage groove 25 is provided, elastically bends and deforms. As a result, an amount of elastic deformation in the longitudinal direction increases. Specifically, in the present embodiment, the plug 20 is configured so as to include the flange portion 22 having the plate thickness dimension "d" further smaller than a dimension "e" in the longitudinal direction of the part where the storage groove 25 is provided. Therefore, the flange portion 22 is elastically deformable, and the amount of the elastic deformation increases drastically. As a result, even in a case where little plastic deformation or looseness appears on the flange portion 22 which is to be the bearing surface, for example, due to an influence of aging, an elastic deformation region still remains, and there is no possibility that the axial force disperses. Therefore, even after elapse of long time, it is less likely that the plug 20 gets loose, and it is possible to prevent oil leakage from the oil pressure circuit hole 10.

Note that in the above-mentioned embodiment, the oil pressure apparatus including the oil pressure path inside the main body has been exemplified. However, the present embodiment can be applied not only to an oil pressure apparatus including an oil pressure path, but also to an oil pressure apparatus including a spool hole inside a main body.

In the above-mentioned embodiment, the blocking configuration of the oil pressure circuit hole having the taper portion on the aperture end portion has been exemplified. However, an oil pressure circuit hole does not necessarily include a taper portion. In the above-mentioned embodiment, in cases where the aperture end portion of the oil pressure circuit hole includes the taper portion, the head portion of the plug is configured to be smaller than the external diameter of the shaft portion. However, a head portion is not necessarily smaller than that of a shaft portion as long as the head portion has an external diameter equal to or lower than an aperture of an oil pressure circuit hole. Further, a head portion of a plug is not necessarily shaped like a regular hexagonal column. The head portion may be shaped like other polygonal columns as long as a tightening tool can be mounted thereon.

REFERENCE SIGNS LIST 1 main body
1a outer surface
10 oil pressure circuit hole
10A oil pressure path
11 internal thread portion
12 taper portion
20 plug
21 shaft portion
22 flange portion
23 head portion
24 external thread portion
25 storage groove
30 O-ring

The invention claimed is:

1. A blocking configuration of an oil pressure circuit hole, comprising:
a plug screwed together with an aperture end portion of the oil pressure circuit hole provided to a main body, the plug including:
a shaft portion;
an external thread portion disposed on a leading end of the shaft portion;
an O-ring mounted on an outer periphery of a base end portion of the shaft portion and pressed between the outer periphery of the shaft portion and an inner periphery of the oil pressure circuit hole to seal the oil pressure circuit hole and the plug;
a flange portion having an external diameter larger than an external diameter of the shaft portion, the flange portion being disposed on a part of a base end side of a storage groove on which the O-ring is mounted; and
a polygonal column-shaped head portion on which a tightening tool is mounted, the head portion being disposed on a part of a base end side of the flange portion,
wherein
the flange portion has a plate thickness in a longitudinal direction of the shaft portion, smaller than both of a height of the head portion, a height of the storage groove in the longitudinal direction and smaller than ¼ of the external diameter of the shaft portion, and the head portion has a circumscribed circle diameter equal to or less than an aperture of the oil pressure circuit hole, and
the flange portion is configured to be pressed, in a state of elastically deformed, on an outer surface of the main body with a bearing surface of the flange portion, when the plug is screwed together with the aperture end portion of the oil pressure circuit hole.

2. The blocking configuration of the oil pressure circuit hole according to claim 1, wherein
the aperture end portion of the oil pressure circuit hole includes a taper portion whose inner diameter gradually grows larger in a direction of an aperture end, and
the O-ring is pressed on an inner periphery of the taper portion.

3. The blocking configuration of the oil pressure circuit hole according to claim 2, wherein the head portion of the plug has the circumscribed circle diameter equal to or less than an external diameter of the shaft portion.

* * * * *